(12) United States Patent
Kaufmann et al.

(10) Patent No.: US 9,194,725 B2
(45) Date of Patent: Nov. 24, 2015

(54) MOUNTING FOR A DISTANCE SENSOR

(75) Inventors: Michael Kaufmann, Gehrden (DE);
Rainer Risse, Pattensen-Reden (DE);
Udo Ronnenberg, Wedemark (DE);
Axel Stender, Hameln (DE); Arne Stephan, Sehnde (DE)

(73) Assignee: WABCO GmbH, Hannover (DE)

( * ) Notice: Subject to any disclaimer, the term of this patent is extended or adjusted under 35 U.S.C. 154(b) by 381 days.

(21) Appl. No.: 13/825,849

(22) PCT Filed: Jul. 21, 2011

(86) PCT No.: PCT/EP2011/003657
§ 371 (c)(1),
(2), (4) Date: Mar. 25, 2013

(87) PCT Pub. No.: WO2012/041414
PCT Pub. Date: Apr. 5, 2012

(65) Prior Publication Data
US 2013/0186211 A1      Jul. 25, 2013

(30) Foreign Application Priority Data
Oct. 2, 2010   (DE) .................. 10 2010 047 403

(51) Int. Cl.
*G01D 11/24* (2006.01)
*G01D 11/30* (2006.01)
*G01S 13/93* (2006.01)
*G01S 15/93* (2006.01)
*G01L 19/14* (2006.01)
*G01P 1/02* (2006.01)

(52) U.S. Cl.
CPC .............. *G01D 11/30* (2013.01); *G01S 13/931* (2013.01); *G01S 15/931* (2013.01); *G01S 2013/9375* (2013.01); *G01S 2013/9378* (2013.01); *G01S 2013/9385* (2013.01); *G01S 2013/9389* (2013.01); *G01S 2015/938* (2013.01)

(58) Field of Classification Search
CPC ............................... G01D 11/24; G01D 11/30
USPC .............. 73/866.5, 431; 356/141.2, 145, 147; 83/649; 180/167–169; 248/27.3
See application file for complete search history.

(56) References Cited

U.S. PATENT DOCUMENTS

| 3,898,652 | A | 8/1975 | Rashid | |
|---|---|---|---|---|
| 5,860,327 | A * | 1/1999 | Stanev | 74/490.05 |
| 5,951,194 | A | 9/1999 | Faass et al. | |
| 6,203,366 | B1 | 3/2001 | Muller et al. | |
| 6,227,501 | B1 * | 5/2001 | Malcolm | 248/27.3 |
| 6,433,753 | B1 | 8/2002 | Zimmermann | |
| 6,809,806 | B1 * | 10/2004 | Carnevale et al. | 356/141.2 |
| 7,546,780 | B2 * | 6/2009 | Santos | G01D 11/30 198/339.1 |
| 2006/0119473 | A1 | 6/2006 | Gunderson et al. | |
| 2009/0256698 | A1 * | 10/2009 | Bonilla | 340/479 |

FOREIGN PATENT DOCUMENTS

| DE | 43 33 066 A1 | 3/1995 |
|---|---|---|
| DE | 197 58 075 A1 | 2/1999 |

(Continued)

*Primary Examiner* — Eric S McCall
*Assistant Examiner* — Anthony W Megna Fuentes
(74) *Attorney, Agent, or Firm* — Kramer Levin Naftalis & Frankel LLP

(57) ABSTRACT

A sensor mounting for a distance sensor includes a fixing part for attaching to a vehicle, and a receiving part attached to the fixing part in an adjustable manner in order to receive the distance sensor. The receiving part is adjustable into at least two different angular positions on the fixing part.

14 Claims, 2 Drawing Sheets

(56) References Cited

FOREIGN PATENT DOCUMENTS

| DE | 100 26 454 C1 | 12/2001 |
| DE | 103 16 535 B3 | 1/2005 |
| DE | 10 2006 056 391 B3 | 4/2008 |
| EP | 0 114 588 A1 | 8/1984 |
| WO | WO 96/14512 | 5/1996 |
| WO | WO 97/48578 | 12/1997 |

* cited by examiner

MOUNTING FOR A DISTANCE SENSOR

FIELD OF THE INVENTION

The invention generally relates to a mounting for a distance sensor.

BACKGROUND OF THE INVENTION

For detection of distances or separations, various distance sensors can be attached to a vehicle. For example, ultrasound and radar distance sensors are known, which can detect the separation or distance to other objects within a spatial angle.

For rear view monitoring systems and ramp approach systems, such distance sensors are attached to the rear of the vehicle. Depending on the application, the sensors are disposed at different angles to the longitudinal axis, in order to be able to cover the necessary monitoring area with the minimum possible number of sensors.

The distance sensors are generally attached to the vehicle by sensor mountings, e.g., to the vehicle chassis or the bumper. Thus, in general, multiple sensor mountings are necessary for the various angular positions of the sensor, e.g., lateral sensor mountings and a central sensor mounting.

This accordingly increases the number of parts for manufacturers and the costs of the tools for manufacturing the sensor mountings.

SUMMARY OF THE INVENTION

Generally speaking, it is an object of the present invention is to provide a sensor mounting that can be flexibly or adjustably attached on or in a vehicle.

According to an embodiment of the present invention, the sensor mounting is designed essentially in two parts, with an attachment part for attachment to the vehicle, e.g., to the vehicle chassis or the bumper, and an accommodating part for accommodating the distance sensor. The attachment part can be a housing that encloses the distance sensor and the accommodating part can be a cover that closes the housing, to which the distance sensor is fixed. Thus, the cover with fixed distance sensor can be placed on the housing in the desired angular position and fixed.

The attachment part can be directly and or indirectly attached to the vehicle, e.g., on a mounting plate. The accommodating part can be fixed onto the attachment part in at least two angular positions, wherein the angular position of the accommodating part defines the angular positions of the distance sensor.

The distance sensor is thus accommodated in the various angular positions of the accommodating part with a different orientation of its sensor axis. The user can thus adjust the orientation of the sensor axis by the angular position of the accommodating part.

The various angular positions of the sensor axis can lie in particular in the horizontal plane, i.e., the XY plane of the vehicle.

According to a preferred embodiment, the accommodating part can be attached to the attachment part in exactly two angular positions, which are rotated relative to each other by 180°, whereby two different orientations of the sensor axis are defined in the horizontal plane.

A first angular position can be such that the sensor axis extends essentially in the vehicle's longitudinal direction (or opposite to the vehicle's x direction).

In this angular position, the sensor mounting can be mounted, for example, centrally at the rear of the vehicle and can detect a distance to the rear. In the other angular position, the sensor axis is orientated towards the side in the horizontal plane. Depending on the installation of the entire sensor mounting, this orientation can face to the left or right, so that a total of three sensor systems can be attached with orientations towards the center and to the left and right.

It should be appreciated that the production costs are significantly reduced, because a uniform sensor mounting can be used for the various sensor orientations.

The adjustment can be carried out by the user. For this purpose, for example, positive locking of the attachment part to the accommodating part can take place, e.g., using mounting eyes or fixing eyelets, which are formed on the two parts and joined or fixed to each other by fixing bolts. Definite positions can thus be set for the user with relatively little effort.

The inventive sensor mounting is characterized moreover by a small parts count and robustness. In principle, only the attachment part and the accommodating part are necessary, possibly with locking mechanisms such as fixing bolts or also possibly a seal between their positioning surfaces for mutual contact.

Still other objects and advantages of the present invention will in part be obvious and will in part be apparent from the specification.

The present invention accordingly comprises the features of construction, combination of elements, and arrangement of parts, all as exemplified in the constructions herein set forth, and the scope of the invention will be indicated in the claims.

BRIEF DESCRIPTION OF THE DRAWINGS

The invention is described in more detail below with reference to exemplary embodiments depicted in the accompanying drawings, in which.

DETAILED DESCRIPTION OF THE PREFERRED EMBODIMENTS

Figure 1:
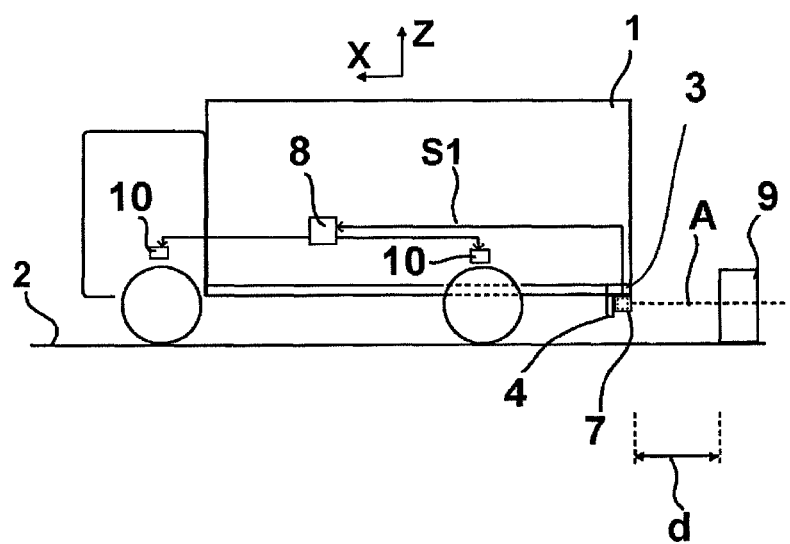
FIG. 1 depicts a vehicle with a sensor system according to an embodiment of the present invention.
Figure 2:
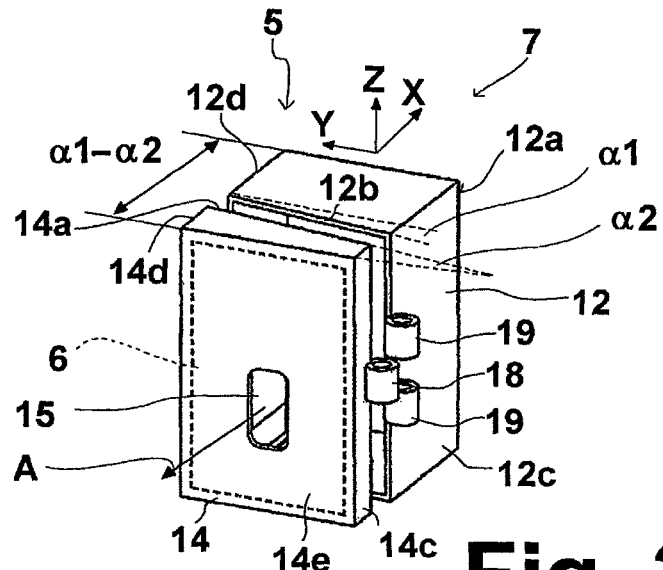
FIG. 2 depicts the sensor mounting according to an embodiment of the invention in its first angular position.
Figure 3:
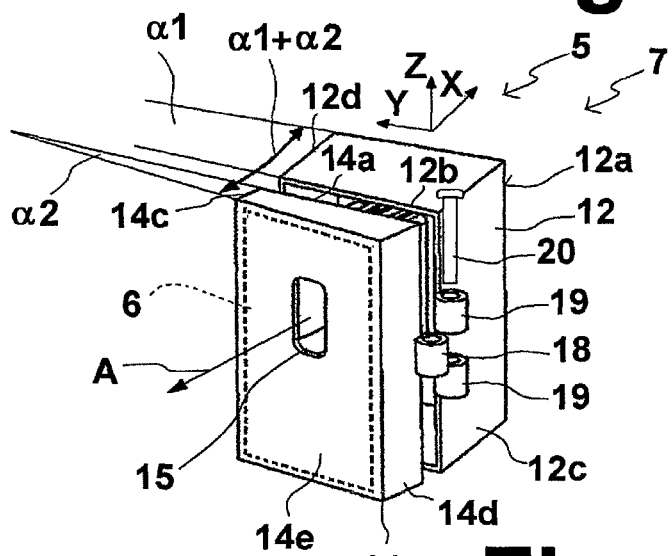
FIG. 3 depicts the sensor mounting of FIG. 2 in its second angular position.

The direction of travel of a vehicle 1 on a road 2 is conventionally designated as X, the vertical direction as Z, and the transverse direction shown in FIGS. 2 and 3 as Y, which together form a vehicle coordinate system. The horizontal plane is defined by the X direction and the Y direction.

A sensor mounting 5 according to an embodiment of the present invention with a distance sensor 6 shown dashed in FIGS. 2 and 3 is attached to the vehicle 1, e.g., on its bumper 3 or on a mounting plate 4 fixed to the bumper 3. The sensor mounting 5 with the distance sensor 6 form a sensor system 7. Attachment of the sensor system 7 is not only possible on the bumper 3 or the rear area of the vehicle 1, but in principle also, for example, on the sides for detecting a lateral distance or even on the front of the vehicle 1. This also allows a different height on the vehicle 1 to be selected.

The distance sensor 6 outputs a sensor signal S1, which can be received in the vehicle 1 by a controller 8 for evaluation of a distance d to an obstruction 9 and, e.g., to output a warning signal if the distance is less than a minimum distance, as well as possibly also to control vehicle brakes 10 if the distance sensor 6 is part of an automatic vehicle brake control system or vehicle driving dynamics control system. In principle, the sensor signals S1 can also be evaluated already within the sensor mounting 5, which then outputs, e.g., a warning signal if the distance is less than the minimum distance.

The sensor mounting 5 is made in multiple parts; according to the embodiment shown it has two parts, namely a housing 12 as the attachment part, which is attached to the chassis side mounting plate 4, e.g., with its planar rear side 12a, and an accommodating part, which in this instance is in the form of a cover 14. The distance sensor 6 can, for example, be essentially rectangular and is attached to the cover 14. The distance sensor 6 is accommodated in the housing 12 and is covered at the rear by the cover 14. An opening 15 is formed in the cover 14, through which the sensitive area of the distance sensor 6 detects a detection region around the sensor axis A.

The housing 12 is formed with a first positioning surface 12b that is oblique or inclined relative to the vertical YZ plane, and which is formed, for example, by the four front edges of the housing 12, i.e., the edge surfaces of its two side walls and the edge surfaces of the upper wall and the lower wall. Correspondingly, a second positioning surface 14a is formed on the cover 14, e.g., likewise by the edge surfaces of its horizontal upper wall and lower wall and its side walls 14c and 14d. In addition, the second positioning surface 14a is offset relative to the vertical YZ plane. The positioning surfaces 14a and 12b are in contact with each other, e.g., with a seal between them.

According to FIGS. 2 and 3, the first positioning surface 12b is inclined relative to the vertical YZ plane at a first inclination angle $\alpha 1$, which thus lies in the horizontal XY plane. For this purpose, e.g., the right side wall 12c of the housing 12 can be somewhat longer than its left side wall 12d.

Correspondingly, the second positioning surface 14a is inclined relative to the vertical YZ plane by a second inclination angle $\alpha 2$, which thus also lies in the horizontal XY plane, for which purpose the side walls 14c and 14d of the cover 14 can be of different lengths.

A bearing eye (fixing eyelet) 18 with a vertical throughway is provided centrally in each case on both side walls 14c and 14d of the cover 14. Correspondingly, two bearing eyes 19 are provided on the side walls 12c and 12d of the housing 12, which align with the bearing eyes 18 when mounting the cover 14 on the housing 12, allowing a fixing bolt 20 shown schematically in FIG. 3 to be placed through the bearing eyes 18, 19, in order to allow the cover 14 to be locked or latched to the housing 12 on both sides.

According to FIGS. 2 and 3, the cover 14 can be attached to the housing 12 in two positions, wherein its bearing eyes (fixing eyelets) 18 are each accommodated between the corresponding bearing eyes 19 of the housing 12. In the second positions of FIG. 3 the cover 14 is rotated by 180° relative to the X direction compared to FIG. 2, i.e., its lateral surfaces 14c and 14d are reversed left and right, as can also be seen from the offset position of the hole 15. In both positions or angular positions the positioning surfaces 12b and 14a are in mutual contact.

Because the distance sensor 6 is attached to the cover 14, it is turned with it. The sensor axis A thus extends differently in the XY plane in FIGS. 2 and 3.

As the inclination angles $\alpha 1=\alpha 2$ are selected, in FIG. 2 the cover surface 14e extends parallel to the mounting surface or the rear side 12a of the housing 12. The sensor axis A thus extends at the angle $\alpha 1-\alpha 2=0$ relative to the vehicle's longitudinal direction (−X direction). In the position of the cover 14 rotated by comparison through 180° according to FIG. 3, the inclination angles $\alpha 1$ and $\alpha 2$ add to a total angle $\alpha 1+\alpha 2=2\alpha 1$, by which the sensor axis A is rotated relative to the X direction in the XY plane.

In principle, even more complex angular positions than those with the simple contact shown of positioning surfaces 12b and 14a are possible. Thus, for example, square designs of the sensor mounting with 4-fold (instead of 2-fold) symmetry are possible.

According to an embodiment of the invention, three sensor systems 7 can be mounted on the bumper 3: e.g., the sensor system 7 according to FIG. 2 can be mounted in the center of the bumper 3, wherein its sensor axis A thus points rearwards in the −X direction. A sensor system 7 can be mounted laterally outwardly, i.e., on the left and right respectively, for which the sensor mounting 5 is turned outwards in the horizontal XY plane according to FIG. 3. The sensor system shown in FIG. 3 can be mounted on the left as shown. For mounting on the right side, it can be rotated relative to FIG. 3 by a total of 180°, so that the sensor axis A points outwards to the right.

The distance sensor 6 can, for example, be an ultrasound sensor or radar sensor or other suitable sensor. According to its design, the hole 15 may be closed with a transparent cover (when in the form of a radar sensor).

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A mounting for a distance sensor, comprising:
   an attachment part for attachment to a vehicle; and
   an accommodating part configured to accommodate the distance sensor and attachable to the attachment part in at least two different angular positions of the accommodating part, a sensor axis of the distance sensor extending in one direction along a horizontal plane of the accommodating part when the accommodating part is in a first angular position of the at least two different angular positions, and the sensor axis extending in a different direction along another horizontal plane of the accommodating part when the accommodating part is in a second angular position of the at least two different angular positions.

2. The mounting as claimed in claim 1, wherein the one direction along the horizontal plane of the accommodating part is substantially parallel to a longitudinal direction of the vehicle.

3. The mounting as claimed in claim 1, wherein the horizontal plane and the another horizontal plane are parallel to one another.

4. The mounting as claimed in claim 1, wherein the different direction along the another horizontal plane of the accommodating part is offset relative to a longitudinal direction of the vehicle.

5. The mounting as claimed in claim 1, wherein the attachment part comprises a first positioning surface and the accommodating part comprises a second positioning surface, and wherein the first and second positioning surfaces are in contact with each other in each of the at least two different angular positions.

6. The mounting as claimed in claim 5, wherein the first positioning surface has a first inclination angle relative to a vertical plane and the second positioning surface has a second inclination angle relative to the vertical plane, the first and second inclination angles being of approximately equal magnitude such that, when the accommodating part is in the second angular position, a direction of the sensor axis is displaced by approximately double the inclination angle relative to a direction of the sensor axis when the accommodating part is in the first angular position.

7. The mounting as claimed in claim 1, wherein the accommodating part is positively latchable to the attachment part in each of the at least two different angular positions.

8. The mounting as claimed in claim 7, wherein the accommodating part and the attachment part each comprises bearing eyes that are positively lockable by fixing bolts in each of the at least two different angular positions.

9. A mounting for a distance sensor, comprising:
a housing for attachment to a vehicle; and
a cover adjustably attached to the housing and configured to accommodate the distance sensor, the cover closing the housing and adjustable on the housing in at least two different angular positions, the distance sensor being attached to the cover and enclosed by the housing, and the cover being rotated through about 180° in each of the at least two different angular positions relative to the other of the at least two different angular positions.

10. The mounting as claimed in claim 1, wherein an opening is defined in the accommodating part for the distance sensor for detecting an exterior area through the opening.

11. The mounting as claimed in claim 1, wherein the mounting is substantially rectangular, wherein the attachment part and the accommodating part form parts of the rectangular mounting, and wherein lateral surfaces of the attachment part and the accommodating part are at least one of the following: (i) substantially parallel to each other in at least one of the at least two different angular positions and (ii) merged together in at least one of the at least two different angular positions.

12. A sensor system, comprising: the mounting as claimed in claim 1, and a distance sensor accommodated by the mounting for detecting a distance to an object.

13. A vehicle, comprising: at least one sensor system as claimed in claim 12, and a controller configured to receive sensor signals of the at least one sensor system, wherein the at least one sensor system is attached to the rear of the vehicle and is orientated substantially towards the rear of the vehicle, and wherein the at least one sensor system (i) in a first angular position of the mounting is orientated with a sensor axis substantially towards the rear of the vehicle opposite to a longitudinal direction of the vehicle, and (ii) in another angular position of the mounting is orientated substantially laterally rearwards.

14. A vehicle, comprising at least three sensor systems and a controller configured to receive sensor signals of the at least three sensor systems, the at least three sensor systems being attached to and orientated substantially towards the rear of the vehicle, each of the at least three sensor systems comprising a mounting and a distance sensor accommodated by the mounting for detecting a distance to an object, each mounting having an attachment part for attachment to the vehicle and an accommodating part adjustably attached to the attachment part and configured to accommodate the distance sensor, each accommodating part being adjustable on the corresponding attachment part in at least two different angular positions, a central one of the at least three sensor systems being set in a first angular position of the at least two different angular positions and a left one and a right one of the at least three sensor systems being each set in a second angular position of the at least two different angular positions, the central sensor system being orientated with a central sensor axis towards the rear of the vehicle substantially opposite and parallel to a longitudinal direction of the vehicle, the left sensor system being orientated with a left sensor axis in a horizontal plane outwards to the left of the vehicle, the right sensor system being orientated with a right sensor axis in the horizontal plane outwards to the right of the vehicle, and housings of the left sensor system and the right sensor system being attached to mounting devices of the vehicle in positions that are rotated by about 180° relative to each other.

* * * * *